(12) United States Patent
Mizutani (10) Patent No.: US 10,414,159 B2
(45) Date of Patent: Sep. 17, 2019

(54) INK JET RECORDING METHOD AND METHOD OF CONTROLLING INK JET RECORDING APPARATUS

(71) Applicant: Seiko Epson Corporation, Tokyo (JP)

(72) Inventor: Akira Mizutani, Matsumoto (JP)

(73) Assignee: Seiko Epson Corporation (JP)

( * ) Notice: Subject to any disclaimer, the term of this patent is extended or adjusted under 35 U.S.C. 154(b) by 20 days.

(21) Appl. No.: 15/711,331

(22) Filed: Sep. 21, 2017

(65) Prior Publication Data

US 2018/0086067 A1    Mar. 29, 2018

(30) Foreign Application Priority Data

Sep. 29, 2016    (JP) ................................. 2016-191290

(51) Int. Cl.
| | |
|---|---|
| B41J 2/14 | (2006.01) |
| B41J 11/00 | (2006.01) |
| C09D 11/322 | (2014.01) |
| C09D 11/106 | (2014.01) |
| C09D 11/38 | (2014.01) |
| C09D 11/08 | (2006.01) |
| B41J 2/165 | (2006.01) |
| B41M 5/00 | (2006.01) |

(52) U.S. Cl.
CPC ......... *B41J 2/14088* (2013.01); *B41J 11/002* (2013.01); *C09D 11/106* (2013.01); *C09D 11/322* (2013.01); *C09D 11/38* (2013.01); *B41J 2/165* (2013.01); *B41M 5/0011* (2013.01); *C09D 11/08* (2013.01)

(58) Field of Classification Search
CPC ....... C09D 11/322; C09D 11/10; C09D 11/30; C09D 11/38; C09D 11/40; C09D 11/107; B41J 2/1642; B41J 2/1646; B41J 2/1606; B41J 2/1631; B41J 2/1632; B41J 2/04581; B41J 2/1623; B41J 2/1629; B41J 2202/03; B41J 2/17513
See application file for complete search history.

(56) References Cited

U.S. PATENT DOCUMENTS

| | | | |
|---|---|---|---|
| 9,605,172 B2 * | 3/2017 | Aoki | .................... B41J 2/17506 |
| 2006/0181568 A1 * | 8/2006 | Aoki | .................... B41J 2/16508 347/30 |
| 2008/0192100 A1 | 8/2008 | Nakajima | |

(Continued)

FOREIGN PATENT DOCUMENTS

| | | |
|---|---|---|
| JP | 2005-029610 A | 2/2005 |
| JP | 2006-206665 A | 8/2006 |

(Continued)

*Primary Examiner* — Erica S Lin
(74) *Attorney, Agent, or Firm* — Harness, Dickey & Pierce, P.L.C.

(57) ABSTRACT

An ink jet recording method includes heating a recording medium, and discharging a water-based ink composition which contains a resin fine particle, water, a water-soluble organic solvent, and a surfactant from an ink jet head so as to adhere the water-based ink composition to the heated recording medium in the heating, in which the water-based ink composition has a contact angle of the water-based ink composition with respect to an ink film obtained by drying the water-based ink composition is equal to or larger than 25° at 100 ms, and is equal to or larger than 20° at 1000 ms.

20 Claims, 1 Drawing Sheet

(56) References Cited

U.S. PATENT DOCUMENTS

| | | | |
|---|---|---|---|
| 2010/0091052 A1 | 4/2010 | Ogawa et al. | |
| 2012/0127248 A1* | 5/2012 | Koganehira | B41J 2/2114 347/102 |
| 2015/0049144 A1* | 2/2015 | Aoki | B41J 2/17506 347/85 |
| 2015/0252200 A1* | 9/2015 | Kagata | C09D 11/106 523/201 |
| 2017/0368819 A1* | 12/2017 | Kagata | B41J 2/04563 |

FOREIGN PATENT DOCUMENTS

| | | |
|---|---|---|
| JP | 2011-201230 A | 10/2011 |
| JP | 2012-201692 A | 10/2012 |
| JP | 5197079 B2 | 5/2013 |
| WO | WO-2006-025221 A1 | 3/2006 |

\* cited by examiner

INK JET RECORDING METHOD AND METHOD OF CONTROLLING INK JET RECORDING APPARATUS

BACKGROUND

1. Technical Field

The present invention relates to an ink jet recording method and a method of controlling an ink jet recording apparatus.

2. Related Art

In the related art, an ink jet recording method of recording images or characters on a recording medium with fine ink droplets discharged from a nozzle of an ink jet head has been known. In recent years, even in a sign printing field and high speed label printing field, studies for employing the ink jet recording method have been conducted. In such a printing field, resin fine particles are added to ink in order to fix the recorded characters or images on the recording medium.

For example, JP-A-2011-201230 discloses an ink jet recording method of performing a first drying step at a temperature range of 40° C. to 60° C. after recording characters or images with ink containing resin fine particles consisting of an urethane resin and an acrylic resin, and then performing a second drying step at a temperature range of 40° C. to 90° C. In addition, JP-A-2012-201692 and JP-A-2006-206665 disclose an aqueous ink jet ink containing core-shell resin fine particles in order to fix recorded characters or images.

However, in a case where recording is performed by discharging ink containing resin fine particles from an ink jet head while heating a recording medium, there is a problem in that the ink jet head is heated and thus the resin fine particles in the ink of the inside of the head are welded, which causes ink clogging.

When a nozzle end of the head is heated, moisture in the ink evaporates, and thus an organic solvent is likely to be rich. Then, the resin fine particles in the ink are welded to the wall surface of the nozzle or the like, and the ink film is likely to be formed. As the ink film is gradually accumulated on the nozzle wall surface, there is a problem in that landing deviation of the ink at the time of continuous printing, and nozzle clogging occurs. In addition, in a case where fine bubbles are mixed and stored in the head, even if the amount of these bubbles is not sufficient to cause discharge failure, moisture in the ink evaporates and the organic solvent becomes rich in the gas-liquid interface occurring in the bubbles, the resin fine particles in the ink become foreign matter and are welded to the inner wall of the head pressure chamber and the ink film is likely to be formed. As the ink film is gradually accumulated on the inner wall, there is a problem in that the flow of the ink is eventually hindered and the nozzle clogging occurs. The problem of the nozzle clogging becomes remarkable as the time for performing continuous printing without performing suction cleaning is long.

On the other hand, when a high boiling point solvent is added to the ink composition in order to improve the clogging resistance of the head, there is a problem in that the drying property of the ink composition on the recording medium is deteriorated, and particularly, image bleeding is likely to occur in an ink non-absorbent or low ink absorbent recording medium. For this reason, improvement of nozzle clogging resistance and suppression of image bleeding are in a trade-off relationship, and thus are difficult to achieve both.

SUMMARY

An advantage of some aspects of the invention is to provide an ink jet recording method in which landing deviation of ink at the time of continuous printing is suppressed, nozzle clogging recoverability is excellent, and a recorded matter with good image quality can be obtained, and a method of controlling an ink jet recording apparatus. In addition, another advantage of some aspects of the invention is to further provide an ink jet recording method in which an image with excellent abrasion resistance can be formed, and a method of controlling an ink jet recording apparatus.

The invention can be realized in the following aspects or application examples.

Application Example 1

According to an aspect of the invention, there is provided an ink jet recording method including heating a recording medium; and discharging a water-based ink composition which contains a resin fine particle, water, a water-soluble organic solvent, and a surfactant from an ink jet head so as to adhere the water-based ink composition to the heated recording medium in the heating, in which the water-based ink composition has a contact angle of the water-based ink composition with respect to an ink film obtained by drying the water-based ink composition is equal to or larger than 25° at 100 ms, and is equal to or larger than 20° at 1000 ms.

In the ink jet recording method according to Application Example 1, the landing deviation of ink at the time of continuous printing is suppressed, the nozzle clogging recoverability is excellent, and a recorded matter with good image quality can be obtained. For example, in a case where a water-based ink composition is further accumulated on an ink film which is formed by heating a nozzle end in the head, it is presumed that resins are welded to each other so as to form a strong film in which the ink films are not easily peeled off from each other, but when the contact angle of the water-based ink composition to the ink film is within the above range, the contact area between the ink films becomes small and it is difficult to firmly weld the ink films to each other, and thereby it is possible to obtain the effect of the application of invention. In addition, in a case where fine bubbles are mixed and stored in the head as described above, the moisture in the ink evaporates and the organic solvent becomes rich in the gas-liquid interface occurring in the bubbles, and the resin fine particles in the ink become foreign matter and are welded to the inner wall of the head pressure chamber and the ink film is likely to be formed, but when the contact angle of the water-based ink composition to the ink film is within the above range, the contact area between the ink films becomes small and it is difficult to firmly weld the ink films to each other, and thereby it is possible to obtain the effect of the application of invention. Further, since the step of heating the recording medium is provided, the ink discharged on the recording medium is rapidly dried, and thereby obtaining a recorded matter with suppressed image bleeding and good image quality.

Application Example 2

In the ink jet recording method according to Application Example 1, in the water-based ink composition, a content of the water-soluble organic solvent having a standard boiling point of equal to or higher than 280° C. may be equal to or less than 3% by mass.

According to the ink jet recording method of Application Example 2, the drying property of the water-based ink composition on the recording medium is high, and thus it is possible to form an excellent image in which the occurrence of image bleeding is suppressed.

Application Example 3

In the ink jet recording method according to Application Example 1 or 2, the water-based ink composition may contain, as the surfactant, at least any one of surfactants of an acetylene glycol surfactant, a silicone surfactant, and a fluorine surfactant.

According to the ink jet recording method of Application Example 4, the contact angle of the water-based ink composition with respect to the ink film obtained by drying the water-based ink composition can be easily adjusted within the above range, and thus it is possible to easily achieve both of the suppression of landing deviation of ink at the time of continuous printing and the nozzle clogging recoverability.

Application Example 4

In the ink jet recording method according to any one of Application Examples 1 to 3, the water-based ink composition may contain, as the surfactant, at least any of a silicone surfactant and a fluorine surfactant having an amount in a range of 0.5% to 5% by mass with respect to a total amount of an ink composition, and an acetylene glycol surfactant having an amount in a range of 0.1% to 1.5% by mass with respect to a total amount of an ink composition.

According to the ink jet recording method of Application Example 4, when the water-based ink composition contains the above two or more kinds of surfactants, the nozzle clogging recoverability becomes more excellent.

Application Example 5

In the ink jet recording method according to any one of Application Examples 1 to 4, the water-based ink composition may contain a nitrogen-containing solvent as the water-soluble organic solvent.

According to the ink jet recording method of Application Example 5, when the water-based ink composition contains the nitrogen-containing solvent, the resin fine particles are likely to be dissolved and thus the film formability is improved. In addition, it is possible to record an image with excellent abrasion resistance.

Application Example 6

In the ink jet recording method according to any one of Application Examples 1 to 5, a surface temperature of a nozzle surface at the time of adhering the water-based ink composition may be equal to or lower than 55° C.

According to the ink jet recording method of Application Example 6, since radiation heat received from a heating unit is reduced or eliminated, drying and composition variation of the water-based ink composition in the ink jet head can be suppressed, and welding of the resin to the inner wall of the head can be reduced. As a result, it is possible to suppress the landing deviation of the ink at the time of continuous printing, and the nozzle clogging recoverability becomes more excellent.

Application Example 7

In the ink jet recording method according to any one of Application Examples 1 to 6, the ink jet head may have a step in a flow path through which ink passes from a pressure chamber to a nozzle.

For example, when a nozzle is formed by etching a nozzle plate (silicon layer), a step is formed in a flow path through which the ink passes from the pressure chamber to the nozzle, and the water-based ink composition is stored in the step to accumulates the ink film and thus the landing deviation of ink at the time of continuous printing and the nozzle clogging are likely to occur. However, according to the ink jet recording method of Application Example 7, even with the ink jet head having such a structure, it is possible to reduce the accumulation of the ink film in the step, and thus the landing deviation of ink at the time of continuous printing can be suppressed, and the nozzle clogging recoverability becomes excellent.

Application Example 8

In the ink jet recording method according to any one of Application Examples 1 to 7, the pressure chamber of the ink jet head may include an ink storage portion for storing ink in a direction extended from an outflow port in an ink movement direction in which a supply port for supplying ink to the pressure chamber and the outflow port for discharging the ink from the pressure chamber are connected to each other.

When the pressure chamber of the ink jet head includes the storage portion which stores such ink, the ink film is accumulated and thus the landing deviation of the ink at the time of the continuous printing and the nozzle clogging are likely to occur. However, according to the ink jet recording method of Application Example 8, even with the ink jet head having such a structure, it is possible to reduce the accumulation of ink film in the ink storage portion, and thus the landing deviation of ink at the time of continuous printing can be suppressed, and the nozzle clogging recoverability becomes excellent.

Application Example 9

In the ink jet recording method according to any one of Application Examples 1 to 8, in the recording method which is performed by using a serial printer, a time during which the recording medium faces the ink jet head during one main scanning may be equal to or shorter than 12 seconds.

According to the ink jet recording method of Application Example 9, since the time during which the nozzle which is not used during one main scanning receives heat from the recording medium is short, drying and composition variation of the water-based ink composition in the nozzle can be suppressed, and welding of the resin to the inner wall of the nozzle can be reduced. As a result, it is possible to suppress deterioration of TA after the continuous printing, and the nozzle clogging recoverability becomes more excellent.

Application Example 10

In the ink jet recording method according to any one of Application Examples 1 to 9, in the water-based ink composition, a content (% by mass) ratio (acetylene glycol surfactant/(fluorine surfactant and silicone surfactant)) of the acetylene glycol surfactant to at least any one of the silicone surfactant and the fluorine surfactant may be in a range of 0.5 to 10.

In a case where the content ratio of the acetylene glycol surfactant to the fluorine surfactant and the silicone surfactant is within the above range, the image quality, the abrasion resistance, the nozzle clogging recoverability, and suppression of the landing position deviation become particularly excellent.

Application Example 11

In the ink jet recording method according to any one of Application Examples 1 to 10, in the water-based ink composition, a content (% by mass) ratio (water-soluble organic solvent/surfactant) of the water-soluble organic solvent to the surfactant may be in a range of 3 to 17.

In a case where the content ratio of the water-soluble organic solvent to the surfactant is within the above range, the image quality, the abrasion resistance, the nozzle clogging recoverability, and suppression of the landing position deviation become particularly excellent, which is preferable.

Application Example 12

In the ink jet recording method according to any one of Application Examples 1 to 11, a resin of the resin fine particle contained in the water-based ink composition may include a resin having a glass transition point of equal to or higher than 40° C.

The anti-clogging properties and the suppression of the landing position deviation become more excellent by including the resin having the glass transition temperature within the above range.

Application Example 13

According to another aspect of the invention, there is provided a method of controlling an ink jet recording apparatus which performs recording by the ink jet recording method according to any one of Application Examples 1 to 12, the recording apparatus controls recording to be performed for one hour or longer without performing maintenance in which ink is discharged from an ink jet head by a unit other than a pressure generation unit for recording by discharging ink.

According to the method of controlling an ink jet recording apparatus of Application Example 13, when the above recording method is used to perform recording, it is possible to realize ink jet recording which is excellent in the discharge stability for one hour or more without any maintenance step.

Application Example 14

In the ink jet recording apparatus which performs recording by the ink jet recording method according to any one of Application Examples 1 to 12, the recording apparatus controls recording to be performed for one hour or longer without performing maintenance in which ink is discharged from an ink jet head by a unit other than a pressure generation unit for recording by discharging ink.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the present invention will be described below. The embodiments described below explain one example of the invention. The invention is not limited to the following embodiments at all, and includes various modifications that are carried out without changing the gist of the invention.

1. Ink Jet Recording Method

The ink jet recording method according to the embodiment includes heating a recording medium; and discharging a water-based ink composition which contains a resin fine particle, water, a water-soluble organic solvent, and a surfactant from an ink jet head so as to adhere the water-based ink composition to the heated recording medium, in which the water-based ink composition has a contact angle of the water-based ink composition with respect to an ink film obtained by drying the water-based ink composition is equal to or larger than 25° at 100 ms, and is equal to or larger than 20° at 1000 ms.

When a nozzle end in the ink jet head is heated by receiving heat from a heating unit, drying of the ink composition easily proceeds at a nozzle end, and an ink film is easily formed. Further, in a case where fine bubbles are mixed and stored in the head, the moisture in the ink evaporates and the organic solvent becomes rich in the gas-liquid interface occurring in the bubbles, and the resin fine particles in the ink become foreign matter and are welded to the inner wall of the head pressure chamber and the ink film is likely to be formed. In a case where another ink film is accumulated on the above ink film, there is a problem in that resins are welded to each other to form a strong film in which the ink films are not easily peeled off from each other, and thereby landing deviation of ink at the time of continuous printing and the nozzle clogging occur. The ink film formed on the end of the nozzle and the inner wall of the head pressure chamber cannot be eliminated by wiping or flushing the nozzle plate and cannot be sufficiently eliminated even with suction cleaning. In addition, there is a problem in that drying of the water-based ink composition progresses even in the ink jet head which is left to stand when the printing is stopped, and similarly, the landing deviation of ink at the time of the continuous printing and the nozzle clogging occur.

The above-described problems are closely related to ease of resin welding. From the viewpoint of abrasion resistance of the recorded matter, it is desired that the resin is easily welded onto the recording material. For this reason, improvement of abrasion resistance and improvement of nozzle clogging resistance are in a trade-off relationship, and thus are difficult to achieve both. Further, the problems are likely to be remarkable particularly in the water-based ink composition which is excellent in the drying property, for example, in the water-based ink composition in which the content of the organic solvent having a standard boiling point equal to or higher than 280° C. is equal to or less than 3% by mass.

Regarding such problems, the inventors of the present invention presumed that when a contact angle of the water-based ink composition with respect to an ink film obtained by drying the water-based ink composition containing a resin fine particle, water, a water-soluble organic solvent, and a surfactant is equal to or larger than 25° at 100 ms, and is equal to or larger than 20° at 1000 ms, even in a case where the ink film is formed at a nozzle end or on the inner wall of the head pressure chamber by drying the water-based ink composition, the contact area between the ink films becomes small and it is difficult to firmly weld the ink films to each other, and thus it is possible to suppress the accumulation of an ink film on the ink film. In addition, the inventors of the present invention presumed that as the contact area between the ink films becomes small and the ink film becomes a thick film, the drying of the ink film slows down so that the ink film is prevented from being dried and firmly adhered, and thus is easy peeled off due to flow of ink, thereby suppressing the accumulation of the ink films. With such a configuration, it is possible to realize an ink jet recording method which is capable of suppressing landing deviation of ink at the time of continuous printing and having excellent nozzle clogging recoverability.

Hereinafter, a water-based ink composition using the ink jet recording method according to the embodiment and the ink jet recording method using the water-based ink composition will be described.

1.1. Water-Based Ink Composition

A "water-based" ink composition of the invention is a composition containing at least water as a main solvent. A composition which does not contain an organic solvent as a main solvent is preferably used. The content of the organic solvent in a composition is preferably equal to or less than 35% by mass, is further preferably equal to or less than 30% by mass, is still further preferably equal to or less than 25% by mass, and is particularly preferably equal to or less than 20% by mass, with respect to 100% by mass of the composition. The content of water in the ink composition (100% by mass) is preferably equal to or greater than 40% by mass, is further preferably equal to or greater than 50% by mass, is still further preferably equal to or greater 60% by mass, and is particularly preferably equal to or greater than 70% by mass.

The water-based ink composition used in the embodiment contains a resin fine particle, water, a water-soluble organic solvent, and a surfactant. Hereinafter, components which may be contained in the water-based ink composition will be described.

1.1.1. Resin Fine Particle

The water-based ink composition of the embodiment contains a resin fine particle for improving the abrasion resistance of an image.

The resin constituting a resin fine particle is not particularly limited, and examples thereof include a homopolymer or a copolymer of a (meth)acrylic acid, (meth)acrylic acid ester, acrylonitrile, cyanoacrylate, acrylamide, olefin, styrene, vinyl acetate, vinyl chloride, vinyl alcohol, vinyl ether, vinyl pyrrolidone, vinyl pyridine, vinyl carbazole, vinyl imidazole, and vinylidene chloride, a fluororesin, and a natural resin. Among them, at least one of a (meth)acrylic resin and a styrene-(meth)acrylic acid copolymer resin is preferable, at least one of a (meth)acrylic resin and a styrene-acrylic acid copolymer resin is further preferable, and a styrene-acrylic acid copolymer resin is particularly preferable. Note that, the above-described copolymer may be in a form of a random copolymer, a block copolymer, an alternating copolymer, and a graft copolymer.

The above-described resin fine particle is not particularly limited, and can be obtained by using a preparing method described below, and may be obtained by combining a plurality of methods as necessary. Examples of the preparing method include a method in which a monomer for producing a component of the resin particles is mixed with a polymerization catalyst (polymerization initiator) and a dispersant and is subjected to polymerization (that is, emulsion polymerization); a method in which a resin having a hydrophilic portion are dissolved in a water-soluble organic solvent, the solution thereby obtained is mixed with water, and the water-soluble organic solvent is then removed from the mixture by distillation or the like; and a method a resin is dissolved in a water-insoluble organic solvent and the solution thereby obtained is mixed with a dispersant and an aqueous solution.

The average particle size of the resin fine particles is preferably in a range of 10 nm to 500 nm, is further preferably in a range of 20 nm to 400 nm, and is particularly preferably in a range of 30 nm to 300 nm. When the average particle size of the resin fine particles is within the above range, the excellent film formability can be obtained and nozzle clogging can be reduced since it is difficult to form a large lump if the resin fine particles are aggregated. In addition, the average particle size in the specification is on a volume basis unless otherwise specified. The measurement can be performed by using a particle size distribution analyzer employing dynamic light scattering as the measurement principle. Examples such a particle size distribution analyzer include "MICROTRAC UPA" manufactured by Nikkiso Co., Ltd.

The content of the resin fine particles (solid content) is preferably in a range of 0.5% by mass to 20% by mass, is further preferably in a range of 2% by mass to 15% by mass, is still further preferably in a range of 3% by mass to 12% by mass, and is particularly preferably in a range of 4 to 10% by mass, with respect to the total mass of the ink composition. The reason for this is that in a case where the content of the resin for improving the abrasion resistance with respect to the recording medium is equal to or greater than 0.5% by mass, the problems of the invention likely to occur.

A glass transition temperature (glass transition point) of the resin of the resin fine particle is preferably equal to or higher than 10° C., is further preferably equal to or higher than 40° C., and is still further preferably equal to or higher than 50° C. An upper limit thereof is preferably equal to or lower than 150° C., and is further preferably equal to or lower than 100° C. When the glass transition temperature is within the above range, anti-clogging properties and the suppression of the landing position deviation are excellent, which is preferable. The glass transition point can be determined from a DSC curve based on JISK 7121 by a DSC method.

1.1.2. Water

The water-based ink composition of the embodiment contains water. Examples of water include ion exchanged water, ultrafiltered water, reverse osmosis water, or distilled water, and ultrapure water from which ionic impurities have been removed as much as possible. In addition, when water that has been sterilized by UV irradiation or addition of hydrogen peroxide is used, the development of mold or bacteria can be prevented when a pigment dispersion liquid and ink using the same are stored over a long period of time.

The content of water is preferably equal to or greater than 40% by mass, is further preferably equal to or greater than 50% by mass, is still further preferably equal to or greater than 60% by mass, and is particularly preferably equal to or greater than 70% by mass, with respect to the total mass of the water-based ink composition.

1.1.3. Water-Soluble Organic Solvent

The water-based ink composition of the embodiment contains a water-soluble organic solvent.

The water-soluble organic solvent is not particularly limited, and examples thereof include alcohols such as methanol, ethanol and isopropyl alcohol; ketones or ketoalcohols such as acetone and diacetone alcohol; ethers such as tetrahydrofuran and dioxane; glycols such as hexane diol, ethylene glycol, diethylene glycol, triethylene glycol, polyethylene glycol, propylene glycol, dipropylene glycol, tripropylene glycol, polypropylene glycol, propanediol, butanediol, and pentanediol; lower alkyl ethers of glycols such as ethylene glycol monomethyl ether, diethylene glycol monomethyl ether, diethylene glycol monoethyl ether and diethylene glycol monobutyl ether; amines having a hydroxyl group such as diethanolamine and triethanolamine; a nitrogen-containing solvent such as 2-pyrrolidone and N-methylpyrrolidone; and glycerin. Among them, from the viewpoint of obtaining a recorded matter with excellent abrasion resistance, a nitrogen-containing solvent is preferable, and 2-pyrrolidone is further preferably. In addition, from the viewpoint of improving the drying property of the water-based ink composition, propylene glycol and 1,2-hexanediol are preferable.

The content of the water-soluble organic solvent is preferably in a range of 5.0% by mass to 30% by mass, is further preferably in a range of 10% by mass to 25% by mass, and is particularly preferably in a range of 15% by mass to 20% by mass, with respect to the total mass of the water-based ink composition.

In addition, the content of the nitrogen-containing solvent is preferably in a range of 3.0% by mass to 25% by mass, is further preferably in a range of 5.0% by mass to 20% by mass, and is particularly preferably in a range of 10% by mass to 17% by mass, with respect to the total mass of the water-based ink composition. When the content of the nitrogen-containing solvent is within the above range, it is easy to obtain a recorded matter with excellent abrasion resistance. On the other hand, the resin fine particles are easily dissolved in the water-based ink composition, and thus the nozzle clogging easily occurs. However, in the water-based ink composition of the embodiment, the nozzle clogging recoverability is improved by setting the contact angle of the water-based ink composition to be equal to or higher than 25° at 100 ms, or equal to or higher than 20° at 1000 ms with respect to an ink film obtained by drying the water-based ink composition.

The water-based ink composition of the embodiment preferably contains the water-soluble organic solvent having the standard boiling point of lower than 280° C. from the viewpoint of the image quality and the abrasion resistance. The water-soluble organic solvent having the standard boiling point of equal to or lower than 260° C. is further preferable, and the water-soluble organic solvent having the standard boiling point in a range of 180° C. to 260° C. is still further preferable. In the water-based ink composition, the content of the water-soluble organic solvent having the standard boiling point of lower than 280° C. is in a range of 5.0% by mass to 30% by mass.

In the water-based ink composition of the embodiment, the content of the water-soluble organic solvent having the standard boiling point equal to or higher than 280° C. is preferably equal to or less than 3% by mass. In addition, the content of the water-soluble organic solvent is preferably equal to or less than 2% by mass, is further preferably equal to or less than 1% by mass, and is particularly preferably equal to or less than 0.5% by mass. When the water-based ink composition contains the water-soluble organic solvent having the standard boiling point of equal to or higher than 280° C., the drying property of the ink on the recording medium is greatly deteriorated. As a result, in various kinds of recording mediums, particularly, in an ink non-absorbent or low absorbent recording medium, not only the density unevenness of the image is conspicuous but also the fixing property of the ink is difficult to obtain.

In the water-based ink composition, the content of the water-soluble organic solvent having the standard boiling point of equal to or higher than 280° C. is preferably equal to or greater than 0% by mass and less than 0.1% by mass, is further preferably equal to or greater than 0% by mass and less than 0.05% by mass, is still further preferably equal to or greater than 0% by mass and less than 0.01% by mass, and particularly preferably equal to or higher than 0% by mass and less than 0.001% by mass, with respect to the total mass of the water-based ink composition. When the content thereof is within the above range, the abrasion resistance of the recorded matter using the water-based ink composition is prevented from being deteriorated by the organic solvent having the standard boiling point of equal to or higher than 280° C., and thus it is possible to obtain a recorded matter with more excellent abrasion resistance. In addition, the content of the water-soluble organic solvent having the standard boiling point of higher than 260° C. is particularly preferable to be within the above range from the viewpoint described above.

As the water-soluble organic solvent having the standard boiling point of equal to or higher than 280° C., for example, glycerin can be exemplified.

1.1.4. Surfactant

The water-based ink composition of the embodiment contains a surfactant. When the water-based ink composition contains the surfactant, a contact angle of the water-based ink composition with respect to the ink film obtained by drying the water-based ink composition is easily adjusted to be equal to or larger than 25° at 100 ms, and to be equal to or larger than 20° at 1000 ms. The surfactant is not particularly, and examples thereof include an acetylene glycol surfactant, a fluorine surfactant, and a silicone surfactant, and it is preferable to contain at least one or more thereof.

As the acetylene glycol surfactant is not particularly limited, one or more kinds selected from an alkylene oxide adduct of 2,4,7,9-tetramethyl-5-decyne-4,7-diol and 2,4,7,9-tetramethyl-5-decyne-4,7-diol and an alkylene oxide adduct of 2,4-dimethyl-5-decyn-4-ol and 2,4-dimethyl-5-decyn-4-ol are preferable. Commercially available products of the acetylene glycol surfactant are not particularly limited, and examples thereof include OLFINE 104 series and OLFINE E series such as OLFINE E1010 (product names, produced by Air Products and Chemicals Inc.) and SURFYNOL 465 and SURFYNOL 61 and SURFYNOL DF 110D (product names, produced by Nissin Chemical Industry CO., Ltd.). The acetylene glycol surfactant may be used alone or two or more kinds thereof may be used in combination.

The fluorine surfactant is not particularly limited, and examples thereof include perfluoroalkyl sulfonate, perfluoroalkyl carboxylate, perfluoroalkyl phosphate ester, a perfluoroalkyl ethylene oxide adduct, perfluoroalkyl betaine, and a perfluoroalkylamine oxide compound. Commercially available products of the fluorine surfactant are not particularly limited, and examples thereof include SURFLON 5144 and 5145 (product name, produced by AGC SEIMI CHEMICAL CO., LTD.); FC-170C, FC-430, FLUORAD FC 4430 (product name, produced by Sumitomo 3M Ltd.); FSO, FSO-100, FSN, FSN-100, and FS-300 (product name, produced by Dupont); and FT-250 and 251 (product name, produced by Neos Corporation). The fluorine surfactant may be used alone or two or more kinds thereof may be used in combination.

Examples of the silicone surfactant include a polysiloxane compound and polyether-modified organosiloxane. Commercially available products of the silicone surfactant are not particularly limited, and specific examples include BYK-306, BYK-307, BYK-333, BYK-341, BYK-345, BYK-346, BYK-347, BYK-348, and BYK-349 (which are product names, produced by BYK Additives & Instruments), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (which are product names, produced by Shin-Etsu Chemical Co., Ltd).

The content of the surfactant contained in the water-based ink composition is preferably in a range of 0.5% to 3% by mass, and is further preferably in a range of 1.0% to 2.5% by mass.

Among them, with the acetylene glycol surfactant, it is possible to more improve the nozzle clogging recoverability. On the other hand, the contact angle of the water-based ink composition is easily controlled by the fluorine surfactant and the silicone surfactant. Accordingly, the water-based ink composition of the embodiment is further preferable to contain at least one of the silicone surfactant and the fluorine surfactant, and the acetylene glycol surfactant.

The lower limit of the acetylene glycol surfactant is preferably equal to or greater than 0.1% by mass, is further preferably equal to or greater than 0.3% by mass, and is particularly preferably equal to or greater than 0.5% by mass, with respect to the total mass of the water-based ink composition. On the other hand, the upper limit of the content is preferably equal to or less than 5% by mass, is further preferably equal to or less than 3% by mass, and is particularly preferably equal to or less than 2% by mass. When the content of the acetylene glycol surfactant is within the above range, an effect of improving the nozzle clogging recoverability can be easily obtained.

The lower limit of the content of the fluorine surfactant and the silicone surfactant is preferably equal to or greater than 0.5% by mass, and is further preferably equal to or greater than 0.8% by mass. On the other hand, the upper limit of the content is equal to or less than 5% by mass, and is further preferably equal to or less than 3% by mass. When the content of the fluorine surfactant and the silicone surfactant is within the above range, the contact angle of the water-based ink composition with respect to the ink film obtained by drying the water-based ink composition is easily adjusted to be equal to or larger than 25° at 100 ms, and to be equal to or larger than 20° at 1000 ms.

The a content (% by mass) ratio (fluorine surfactant and silicone surfactant)/(acetylene glycol surfactant)) of the silicone surfactant and the fluorine surfactant to the acetylene glycol surfactant contained in the water-based ink composition is preferably in a range of 0.5 to 10, is further preferably in a range of 1 to 8, and is still further preferably in a range of 2 to 7. When the content ratio of the fluorine surfactant and the silicone surfactant to the acetylene glycol surfactant is within the above range, the image quality, the abrasion resistance, the nozzle clogging recoverability, and suppression of the landing position deviation become particularly excellent.

Further, content (% by mass) ratio (water-soluble organic solvent/surfactant) of the water-soluble organic solvent to the surfactant contained in the water-based ink composition is preferably in a range of 3 to 17, is further preferably in a range of 7 to 15, and is still further preferably in a range of 9 to 13. When the content ratio of the water-soluble organic solvent to the surfactant is within the above range, the image quality, the abrasion resistance, the nozzle clogging recoverability, and suppression of the landing position deviation become particularly excellent.

1.1.5. Coloring Material

As a coloring material, a pigment or dye can be used, and a pigment is preferably used. The pigment is not particularly limited, and examples thereof include the following pigments.

A black pigment is not particularly limited, and examples thereof include No. 2300, No. 900, MCF88, No. 33, No. 40, No. 45, No. 52, MA7, MA8, MA100, and No. 2200B (which are product names, produced by Mitsubishi Chemical Corporation)), Raven 5750, Raven 5250, Raven 5000, Raven 3500, Raven 1255, and Raven 700 (which are product names, produced by Carbon Columbia), Regal 400R, Regal 330R, and Regal 660R, Mogul L, Monarch 700, Monarch 800, Monarch 880, Monarch 900, Monarch 1000, Monarch 1100, Monarch 1300, and Monarch 1400 (which are product names, produced by CABOT JAPAN K.K.), Color Black FW1, Color Black FW2, Color Black FW2V, Color Black FW18, Color Black FW200, Color Black 5150, Color Black 5160, and Color Black 5170, Printex 35, Printex U, Printex V, and Printex 140U, Special Black 6, Special Black 5, Special Black 4A, and Special Black 4 (which are product names, produced by Degussa).

The white pigment is not particularly limited, and examples thereof include C.I. Pigment Whites 6, 18, and 21, a white inorganic pigment of titanium oxide, zinc oxide, zinc sulfide, antimony oxide, magnesium oxide, and zirconium oxide. In addition to the white inorganic pigment, a white organic pigment such as white hollow resin particles and polymer particles can be used.

A yellow pigment is not particularly limited, and examples thereof include C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

A magenta pigment is not particularly limited, examples thereof include C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245, or C.I. Pigment Violets 19, 23, 32, 33, 36, 38, 43, and 50.

A cyan pigment is not particularly limited, and examples thereof include C.I. Pigment Blues 1, 2, 3, 15, 15:1, 15:2, 15:3, 15:34, 15:4, 16, 18, 22, 25, 60, 65, and 66, and C.I. Bad Blues 4 and 60.

A pigment used for color ink other than magenta, cyan, and yellow is not particularly limited, and examples thereof include C.I. Pigment Greens 7 and 10, C.I. Pigment Browns 3, 5, 25, and 26, C.I. and Pigment Oranges 1, 2, 5, 7, 13, 14, 15, 16, 24, 34, 36, 38, 40, 43, and 63.

A pearl pigment is not particularly limited, and examples thereof include pigments having pearly glossiness and interference glossiness such as titanium dioxide-coated mica, fish scale foil, and bismuth oxychloride.

A metallic pigment is not particularly limited, but examples thereof include particles made of a monomer such as aluminum, silver, gold, platinum, nickel, chromium, tin, zinc, indium, titanium, and copper, or an alloy thereof.

The content of the pigment is preferably in a range of 0.4% to 12% by mass, is further preferably in a range of 1% to 8% by mass, and is particularly preferably in a range of 2% to 5% by mass, with respect to the total mass of the water-based ink composition.

1.1.6. Other Components

In the water-based ink composition of the embodiment, various additives such as a defoaming agent, a dissolution aid, a viscosity adjusting agent, a pH adjusting agent, an antioxidant, a preservative, a mildew proofing agent, a corrosion inhibitor, and a chelating agent for capturing metal ions affecting dispersion can be added in order to maintain good storage stability and discharge stability from the head, and in order to prevent the clogging or deterioration of the ink.

1.1.7. Physical Properties of Water-Based Ink Composition

The water-based ink composition has a contact angle of the water-based ink composition with respect to an ink film obtained by drying the water-based ink composition is equal to or higher than 25° at 100 ms, and is equal to or higher than 20° at 1000 ms. The contact angle at 100 ms is preferably equal to or higher than 30°, is further preferably equal to or higher than 33°, and is particularly preferably equal to or higher than 35°. In addition, the contact angle at 1000 ms is preferably equal to or larger than 21°, is further preferably equal to or larger than 23°, and is particularly preferably equal to or larger than 25°. When the contact angle at 100 ms and 1000 ms is within the above range, even in a case where the ink film is formed at a nozzle end or on the inner wall of the head pressure chamber by drying the water-based ink composition, the contact area between the ink films becomes small and it is difficult to firmly weld the ink films to each other, and thus it is possible to suppress the accumulation of an ink film on the ink film. With such a configuration, it is possible to realize an ink jet recording method which is capable of suppressing landing deviation of ink at the time of continuous printing and having excellent nozzle clogging recoverability.

Here, the contact angle at 100 ms is obtained by defining a contact angle immediately after the water-based ink composition is in contact with the ink film, and the contact angle at 1000 ms is obtained by defining a contact angle which is in an almost stable state after the water-based ink composition is in contact with the ink film. That is, when both contact angles are equal to or larger than a predetermined value, as described above, even in the case where the ink film is formed at the end of the nozzle by drying the water-based ink composition, accumulation of the ink film can be effectively suppressed. The upper limit of each of the contact angles is equal to or smaller than 90°, but is not limited. For example, it may be set to be independently equal to or smaller than 60°.

The "contact angle of the water-based ink composition with respect to the ink film" in the invention is a value of a dynamic contact angle measured by a liquid droplet method (change over time) with a contact angle meter (PCA-1, manufactured by Kyowa Interface Science Co., Ltd). Specifically, a water-based ink composition is added dropwise to a substrate, an ink film is formed on the substrate by drying the water-based ink composition, the water-based ink composition is put into the contact angle meter, and then when the timing of adding dropwise the water-based ink composition to the ink film at 25° C. is set to be 0 ms, the values of the dynamic contact angle at the timing of 100 ms and at 1000 ms is obtained.

1.2. Ink Jet Recording Method

The ink jet recording method of the embodiment includes a heating step of heating a recording medium (hereinafter, referred to as "heating step" in some cases), and a step of discharging the water-based ink composition from the ink jet head so as to adhere the water-based ink composition to the recording medium heated by the heating step (hereinafter, referred to as "adhering step" in some cases).

1.2.1. Heating Step

The heating step is a step of heating a recording medium. When the water-based ink composition is discharged on the heated recording medium, the resin fine particles in the ink discharged on the recording medium are dissolved and cooled so as to form an ink film, and thus abrasion resistance of an image becomes excellent.

The heating method is not particularly limited, and examples thereof include a method of heating by using a heater provided on the upper side of the head, a heater (platen heater) which is provided below the recording medium on the lower side of the head so as to be in contact with the recording medium, or hot air mechanism.

In the heating step, it is preferable that the heating be performed such that a surface temperature of the nozzle surface at the time of adhering ink is equal to or lower than 55° C. The nozzle surface is a surface on the side where ink is discharged from the nozzle of the member in which the nozzle is formed in the head, and is a nozzle plate on which a nozzle is formed. Hereinafter, the nozzle surface is denoted by the nozzle plate as one example thereof. The upper limit of the surface temperature of the nozzle plate at the time of adhering ink is preferably equal to or lower than 50° C., is further preferably equal to or lower than 45° C., is still further preferably equal to or lower than 40° C., and is particularly preferably equal to or lower than 38° C. On the other hand, the lower limit of the surface temperature of the nozzle plate at the time of adhering ink is preferably equal to or higher than 25° C., is further preferably equal to or higher than 30° C., and is still further preferably equal to or higher than 32° C. When the surface temperature of the nozzle plate at the time of adhering ink is within the above range, the radiation heat received from a heating unit is reduced or eliminated, drying and composition variation of the water-based ink composition in the ink jet head can be suppressed, and thus it is possible to prevent the ink film from being formed on the nozzle in the head. The surface temperature of the nozzle surface is the same as or lower than the surface temperature of the recording medium at the time of adhering ink described blow to the recording medium in many cases.

Note that a step of adhering a reaction solution containing an aggregating agent for aggregating the components of the water-based ink composition to the recording medium may be provided before adhering the water-based ink composition to the recording medium. With this, it is possible to decrease the temperature of the recording medium in the adhering step.

1.2.2. Adhering Step

The adhering step is a step of discharging the above-described water-based ink composition from the ink jet head so as to adhere the water-based ink composition to the recording medium heated in the heating step. The heating step and the discharging step may be performed at the same time. Discharging the water-based ink composition through the ink jet method can be performed by using a well-known ink jet recording apparatus. Examples of the discharging method include a piezo method or a method of discharging ink by bubbles generated by heating ink. Among them, a piezo method is preferably used from the viewpoint of hardness of alteration of water-based ink composition.

The maximum adhesion amount of the water-based ink composition per unit area of the recording medium is preferably equal to or greater than 7 mg/inch$^2$, is further preferably equal to or greater than 10 mg/inch$^2$, is still further preferably equal to or greater than 12 mg/inch$^2$, and is particularly preferably equal to or greater than 13 mg/inch$^2$. In a case of the non-absorbent recording medium, when the adhesion amount of the water-based ink composition per unit area of the recording medium is equal to or greater than 7 mg/inch$^2$, image bleeding is likely to occur; however, in the ink jet recording method according to the embodiment, since the water-based ink composition is discharged on the heated recording medium, the ink film is rapidly formed and thus the occurrence of the image bleeding is suppressed. Accordingly, there is no problem even if the adhesion amount of the water-based ink composition per unit area of the recording medium is as high as being equal to or greater than 7 mg/inch$^2$. The upper limit of the adhesion amount of the water-based ink composition per unit area of the recording medium is not particularly limited, and for example, it is preferably equal to or less than 20 mg/inch$^2$.

1.2.3. Drying Step

The ink jet recording method according to the embodiment may include a drying step of drying the recording medium on which water-based ink composition is adhered after the discharging step. With this, the resin fine particles contained in the water-based ink composition on the recording medium are melted, and thereby a recorded matter with good filling can be prepared. At this time, the temperature of the recording medium in the drying step is preferably equal to or higher than 70° C., is further preferably in a range of 70° C. to 120° C., and is still further preferably in a range of 80° C. to 100° C. When the drying temperature is within the above range, the abrasion resistance is likely to be more improved.

The ink jet recording method according to the embodiment may include a maintenance step of discharging water-based ink composition by a mechanism other than the mechanism of discharging the ink for recording provided in the ink jet head. Examples of the mechanism of discharging the ink for recording provided in the ink jet head include a piezo element and a heater element which is provided in a pressure chamber and applies pressure to the ink. The maintenance step may be a step of discharging the water-based ink composition from the nozzle by applying the pressure to the ink jet head from the outside. As compared with flushing or the like described below, the maintenance step has a strong force to discharge ink or foreign matters from the ink jet head, and even if there is a concern that the resin is welded to the inner wall of the ink jet head by including this process, it is possible to suppress such a concern and further improve the clogging property. In contrast, the maintenance step tends to take time to be performed.

In addition, in the ink jet recording method according to the embodiment, it is preferable to control so as to perform recording for one hour or more without performing the above maintenance step. By controlling in this manner, there is no case where the recording speed is reduced by interrupting the recording along with the aforementioned step, which is preferable. Even in such a case, by using the water-based ink composition described above, the landing deviation of ink at the time of the continuous printing and the clogging of the ink jet head can be suppressed, and a good image without bleeding can be recorded. Here, as another mechanism described above, a mechanism for applying pressure such as application of suction (negative pressure), application of positive pressure from the upstream of the head, and the like can be exemplified. This mechanism is not for ink discharge (such as flushing) using a function for discharging ink from the nozzle to the recording medium for recording provided by the head. Note that, the recording time may not be continuous, and if there is no maintenance step described above, there may be a period of time during which the printer is not used between one recording and the subsequent recording. The recording time is a recording time including a primary stop time such as recording stop and carriage stop occurring during the recording. In addition, the recording time is a cumulative time of recording without performing maintenance step as described above, but does not include the time during which the printer is not used between one recording and the subsequent recording. The recording time is preferably one hour or more, is further preferably 1.5 hour or more, is still further preferably two hours or more, and is particularly preferably three hours or more. The upper limit of the recording time is not limited, and is preferably ten hours or less, is further preferably five hours or less, and is still further preferably four hours or less.

In addition, in the ink jet recording method according to the embodiment, from the above-described viewpoint, it is preferable to not perform the maintenance step during the recording in one recording. Further, from the above-described viewpoint, it is preferable to perform the maintenance step at least either before recording or after recording.

1.2.4. Application

The ink jet recording method according to the embodiment is suitable for a sign printing field of displaying outdoors and a label printing field from the viewpoint that when the recording is performed on the non-absorbent recording medium or low absorbent recording medium, the image quality is excellent. In the non-absorbent recording medium or low absorbent recording medium, image bleeding due to cissing of the water-based ink composition tends to occur as the absorption is low or even not absorbed. Thus, for such a recording medium, it is advantageous to use the ink jet recording method according to the embodiment.

Here, "low absorbent recording medium" or "non-absorbent recording medium" means a recording medium whose water absorption amount on a print surface for 30 msec from the contact with water is 10 mL/m$^2$ or less in a Bristow method. The Bristow method is the most prevailing method as a method for measuring the liquid absorption amount in a short time and is also employed by JAPAN TAPPI, The details of the test method are described in Standard No, 51 "Paper and Paperboard-Liquid Absorbency Test Method-Bristow Method" in "JAPAN TAPPI Paper and Pulp Test Methods 2000 Edition".

The low absorbent recording medium is not particularly limited; however, examples thereof include coated paper which is provided with a coating layer for receiving an oil-based ink on the surface. The coated paper is not particularly limited; however, examples thereof include printing paper such as art paper, coated paper, and matte paper.

The non-absorbent recording medium is not particularly limited, and examples thereof include a plastic film which does not have an ink absorbent layer, a recording medium in which a base material such as a sheet is coated with plastic, and a recording medium to which a plastic film is adhered. Examples of plastics here include polyvinyl chloride, polyethylene terephthalate, polycarbonate, polystyrene, polyurethane, polyethylene, and polypropylene.

In addition to the recording medium described above, it is also possible to use an ink non-absorbent or low absorbent recording medium such as plates of metals such as iron, silver, copper, and aluminum, glass and the like.

1.2.5. Ink Jet Recording Apparatus

Figure 1:
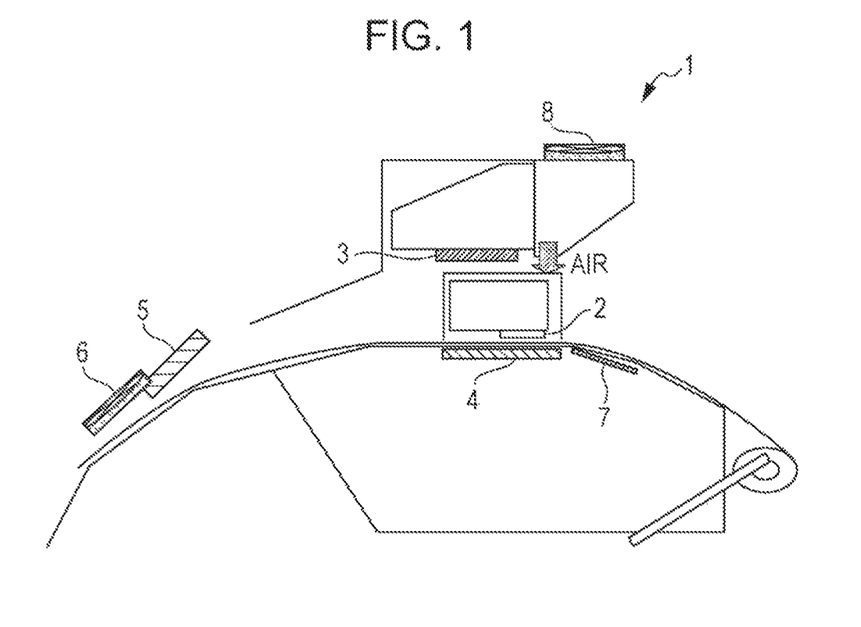
FIG. 1 is a schematic sectional view schematically illustrating an ink jet recording apparatus.

An examples of an ink jet recording apparatus which can be used in the ink jet recording method according to the embodiment will be described with reference to the drawings. FIG. 1 is a schematic sectional view schematically illustrating an ink jet recording apparatus. As illustrated in FIG. 1, an ink jet recording apparatus 1 is provided with an ink jet head 2, an IR heater 3, a platen heater 4, a hardening heater 5, a cooling fan 6, a preheater 7, and a ventilation fan 8. The ink jet head 2 is to discharge the water-based ink composition with respect to the recording medium, and for example, a type illustrated in FIG. 2 can be used.

Figure 2:
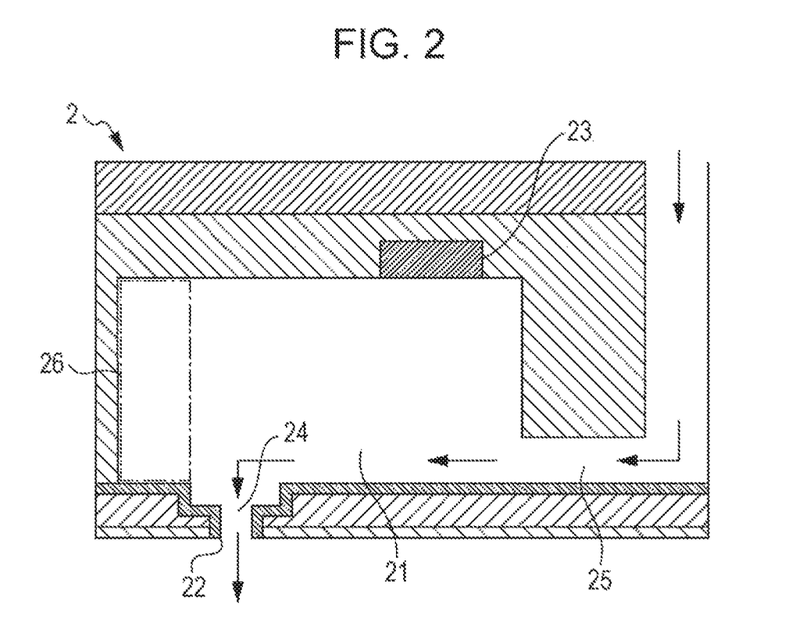
FIG. 2 is a schematic sectional view schematically illustrating a structure of an ink jet head.

FIG. 2 is a schematic sectional view schematically illustrating a structure of an ink jet head 2. The ink jet head 2 is provided a pressure chamber 21 and a piezoelectric element 23 for discharging the water-based ink composition from a nozzle 22 by applying pressure to the pressure chamber 21, and in the pressure chamber 21, the piezoelectric element 23 is disposed in a place other than a position facing an outflow port 24 which communicates with the nozzle 22. In a case where the piezoelectric element 23 is provided immediately above the nozzle 22, the extrusion force of the ink from the piezoelectric element 23 is also transmitted directly to the ink film adhered to the nozzle wall surface, and thus adhesion of the ink film can be eliminated, but in a case where the piezoelectric element 23 is not provided immediately above the nozzle 22, it is difficult to eliminate the adhesion of the ink film, and thus it is particularly useful for the invention.

The position facing the outflow port 24 which communicates with the nozzle 22 in the pressure chamber 21 is a region surrounded by extension lines in the case of extending the line toward the upper side from the wall of the outflow port 24 in FIG. 2. Here, for example, in the ink jet head 2 in FIG. 2, the outflow port 24 corresponds to a portion of the outflow port 24 in which the area in the direction perpendicular to the direction in which ink is discharged is the same as the nozzle 22. The description "the piezoelectric element 23 is disposed in a place other than the above-described position" means that at least a portion of the piezoelectric element 23 is absent in at least a portion of this region.

The pressure chamber 21 is provided with a storage portion 26 for storing ink in the extension direction further than an ink movement direction connecting a supply port 25 for supplying ink to the pressure chamber 21 and the outflow port 24 of the pressure chamber 21. Here, the extension direction means, in a case where one straight line between the supply port 25 and the outflow port 24 is drawn in the direction from the supply port 25 to the outflow port 24, not only a portion extending in this direction from the outflow port 24, but also a portion of the pressure chamber existing on the above-described direction side from this plane when a plane perpendicular to one straight line defined above is provisionally provided at the outflow port 24. For example, it is the whole of the storage portion 26 in FIG. 2.

The storage portion 26 is a part formed on the process of mass production of the ink jet head 2, and thus it is difficult to perform mass production of the ink jet head provided with the pressure chamber without the storage portion 26. In the storage portion 26, the water-based ink composition is likely to stagnate, and the ink-dried matters are likely to be accumulated. Then, when bubbles gather and a space is formed, the ink-dried matter is adhered to the wall surface. In contrast, the ink jet recording method according to the embodiment is particularly useful for the invention from the viewpoint that even with the ink jet head having such a structure, it is possible to reduce the accumulation of the ink dried matters in the storage portion 26.

In addition, the ink jet head 2 has a step in a flow path through which ink passes from the pressure chamber 21 to the nozzle 22. This step is a part generated when the nozzle 22 is formed by etching the silicon layer (nozzle plate), and it is difficult to form a nozzle plate in which a step is eliminated by etching a silicon layer. The step is not limited to being formed on the nozzle plated as long as it is formed between the outflow port 24 and the nozzle in the pressure chamber 21. At the time of initial filling or cleaning of ink, bubbles may be adhered to the step and remain, and the bubbles are levitated from the step during the recording, and gathered above the pressure chamber. Here, the gas-liquid interface is generated to dry the ink, and thereby an ink dried matter (resin accumulated matter) is generated. In contrast, the ink jet recording method according to the embodiment is particularly useful from the viewpoint that even with such a step, it is possible to reduce the accumulation of the ink dried matters in the step. Here, the step means the inner wall of the flow path has an angle of more than equal to or larger than 30° in the flow path between the pressure chamber and the nozzle, and the angle is more typically equal to or larger than 60°.

A plurality of cavities, and a plurality of discharge driving units and nozzles each of which is provided for each cavity may be independently provided in one head. The discharge driving unit can be formed by using an electromechanical conversion element such as a piezoelectric element for changing the volume of the cavity by mechanical deformation, and an electrothermal conversion element for emitting heat so as to generate and discharge bubbles to the ink.

The ink jet recording apparatus 1 illustrated in FIG. 1 is provided with the IR heater 3 and the platen heater 4 for heating the recording medium at the time of discharging the water-based ink composition from the ink jet head 2. In the adhering step of the water-based ink composition, at the time of heating the recording medium, at least one of the IR heater 3 and the platen heater 4 may be used.

Note that, when the IR heater 3 is used, it is possible to heat the recording medium from the ink jet head side. With this, the ink jet head 2 is likely to be heated at the same time, but as compared with the case of heating the rear surface of the recording medium by the platen heater 4, it is possible to raise the temperature without being affected by the thickness of the recording medium. Further, when the platen heater 4 is used, it is possible to heat the recording medium from the side opposite to the ink jet head 2 side. With this, the ink jet head 2 is relatively less likely to be heated. Here, the surface temperature of the recording medium by the IR heater 3 or the platen heater 4 is preferably equal to or lower than 45° C., is further preferably equal to or lower than 40° C., is still further preferably equal to or lower than 38° C., and is particularly preferably equal to or lower than 35° C. With this, the radiation heat received from the IR heater 3 and the platen heater 4 is reduced or eliminated, and thus drying and composition variation of the water-based ink composition in the ink jet head can be suppressed, and welding of the resin to the inner wall of the head can be reduced. The lower limit of the surface temperature of the recording medium is preferably equal to or higher than 30° C., and is further preferably equal to or higher than 32° C. At the time of the adhering step of ink composition, the difference between the surface temperature of the recording medium and the surface temperature of the nozzle surface (surface temperature of recording medium-surface temperature of nozzle surface) is preferably in a range of 0° C. to 10° C., is further preferably equal to or lower than 7° C., is still further preferably equal to or lower than 5° C., and is particularly preferably equal to or lower than 4° C. In addition, it is further preferably equal to or higher than 1° C., and is still further preferably equal to or higher than 2° C. When the temperature difference is within the above range, the image quality, the abrasion resistance, and the nozzle clogging recoverability are excellent. In addition, the temperature difference in the above range is preferable in terms of ease of designing the recording apparatus. Further, at the time of the adhering step of the ink composition, a distance (direct distance) between the surface of the recording medium and the surface of the nozzle surface is preferably equal to or shorter than 10 mm, is further preferably equal to or shorter than 7 mm, is still further preferably equal to or shorter than 5 mm, and is particularly preferably equal to or shorter than 3 mm.

Further, the distance is preferably equal to or longer than 0.5 mm, and is further preferably equal to or longer than 1 mm. When the distance is within the above range, it is easy to design the recording apparatus, and to set the surface temperature difference within the above range, which is preferable.

The hardening heater 5 is for drying and solidifying the water-based ink composition recorded on the recording medium. When the hardening heater 5 heats the recording medium on which the image is recorded, the moisture contained in the water-based ink composition more rapidly evaporates and the ink film is formed by the resin fine particles contained in the water-based ink composition. In this way, the ink film firmly fixes (adheres) to the recording medium, and thus it is possible to obtain a high-quality image excellent in abrasion resistance in a short time. The drying temperature by the hardening heater 5 is preferably in a range of 40° C. to 120° C., is further preferably in a range of 60° C. to 100° C., and is still further preferably in a range of 80° C. to 90° C.

The ink jet recording apparatus 1 may include a cooling fan 6. After drying, the water-based ink composition on the recording medium is cooled by the cooling fan 6 so that an ink film can be formed on a recording medium with good adhesion.

In addition, the ink jet recording apparatus 1 may include a preheater 7 for previously heating (preheating) a recording medium before discharging the water-based ink composition on the recording medium. Further, the recording apparatus 1 may include a ventilation fan 8 such that the water-based ink composition adhered on the recording medium is more efficiently dried.

In a case where the ink jet recording apparatus 1 is a serial printer, the time during which the recording medium faces the ink jet head 2 during one main scan is preferably 12 seconds or less. The upper limit of the time is further preferably 10 seconds or less, and is particularly preferably 6 seconds or less. The lower limit of the time is preferably one second or more, is further preferably two seconds or more, and is particularly preferably three seconds or more. The time during which the recording medium faces the ink jet head during one main scanning is equal to the time during which a nozzle which is not used during one scanning receives heat from the recording medium. That is, when the time is within the above range, the time during which a nozzle which is not used during one main scanning receives heat from the recording medium is sufficiently short, and thus drying and composition variation of the water-based ink composition in the nozzle can be suppressed, and it is possible to reduce the resins to be welded on the inner wall of the nozzle. As a result, the landing deviation of ink at the time of the continuous printing can be suppressed, and the nozzle clogging recoverability becomes more excellent. Note that, the serial printer is an apparatus in which a head is mounted on a carriage that moves in a predetermined direction and which discharges liquid droplets of ink onto a recording medium as the ink jet head 2 moves as the carriage moves.

2. Examples

Hereinafter, the invention will be described more specifically with reference to examples, but the invention is not limited to these examples. In the examples and comparative examples, "parts" and "%" are on a mass basis unless otherwise specified.

2.1. Preparing of Water-Based Ink Composition

A pigment among the compositions (% by mass) of the materials indicated in the following Table 1 and 0.3 parts by mass of a pigment dispersant with respect to 1 part by mass of the pigment were mixed in water and milled with a bead mill to prepare a pigment dispersion liquid. The prepared pigment dispersion liquid and other components were sufficiently stirred so as to obtain a water-based ink compositions 1 to 12. Residues in Table 1 include the pigment dispersant.

Measurement of Contact Angle

A water-based ink composition prepared as described above was added dropwise to a glass plate inclined at room temperature of 45° by using a dropper, and ink flowed onto the glass plate to obtain a surface to be used for a test of the glass plate completely covered with the ink. The glass plate was dried at 45° C. for one hour. With the obtained film which is ink-coated and dried, a contact angle of the water-based ink composition with respect to the film was measured. The measurement was performed in such a manner that the water-based ink composition was put into the contact angle meter PCA-1 (manufactured by Kyowa Interface Science Co., Ltd.), and then when the timing of adding dropwise the water-based ink composition to the ink-dried coated film at 25° C. was set to be 0 ms, values of the dynamic contact angle at the timing of 100 ms and at 1000 ms were obtained. The results thereof are also indicated in the following Table 1.

TABLE 1

|  |  | Ink 1 | Ink 2 | Ink 3 | Ink 4 | Ink 5 | Ink 6 |
|---|---|---|---|---|---|---|---|
| Pigment | PB15:3 | 2 | 2 | 2 | 2 | 2 | 2 |
| Water-soluble organic solvent | Propylene glycol (standard boiling point of 188° C.) | 5 | 5 | 5 | 5 | 5 | 5 |

TABLE 1-continued

| | | | | | | | |
|---|---|---|---|---|---|---|---|
| | | 2-pyrrolidone (standard boiling point of 245° C.) | 15 | 9 | 15 | 9 | 9 | 9 |
| | | 1,2-hexanediol (standard boiling point of 224° C.) | 3 | 5 | 3 | 5 | 5 | 5 |
| | | Glycerin (standard boiling point of 290° C.) | | | | | | 5 |
| Surfactant | Acetylene glycol surfactant | DF110D | 0.3 | 0.3 | 0.3 | 0.3 | | 0.3 |
| | | OLFINE E1010 | | 0.5 | 1 | 0.5 | | 0.5 |
| | Silicone surfactant or fluorine surfactant | BYK348 | 2 | 1.5 | 1 | 1.5 | 1.5 | 1.5 |
| | | SURFLON S145 | | | | 1 | | |
| Resin fine particle (solid content) | | JONCRYL 7610 | 2 | 2 | 2 | 2 | 2 | 2 |
| | | JONCRYL 611 | | | | | | |
| Water | | | Residue | Residue | Residue | Residue | Residue | Residue |
| Total (mass %) | | | 100 | 100 | 100 | 100 | 100 | 100 |
| Content ratio (water-soluble organic solvent/surfactant) | | | 10 | 8 | 10 | 6 | 13 | 10 |
| Content ratio (fluorine surfactant and silicone surfactant)/acetylene glycol surfactant) | | | 6.666 | 1.875 | 0.76923 | 3.125 | — | 1.875 |
| Contact angle (°) | At 100 ms | | 35 | 35 | 25 | 37 | 34 | 34 |
| | At 1000 ms | | 30 | 21 | 24 | 24 | 21 | 20 |
| | | | Ink 7 | Ink 8 | Ink 9 | Ink 10 | Ink 11 | Ink 12 |
| Pigment | | PB15:3 | 2 | 2 | 2 | 2 | 2 | 2 |
| Water-soluble organic solvent | | Propylene glycol (standard boiling point of 188° C.) | 5 | 5 | 5 | 5 | | 5 |
| | | 2-pyrrolidone (standard boiling point of 245° C.) | 9 | 5 | 15 | 15 | 15 | 15 |
| | | 1,2-hexanediol (standard boiling point of 224° C.) | 5 | 5 | 3 | 3 | 3 | 3 |
| | | Glycerin (standard boiling point of 290° C.) | | | | | 5 | |
| Surfactant | Acetylene glycol surfactant | DF110D | 0.3 | 0.3 | 0.3 | 0.3 | 0.3 | 0.3 |
| | | OLFINE E1010 | 0.5 | 0.5 | 1 | 0.8 | 0.8 | |
| | Silicone surfactant or fluorine surfactant | BYK348 | 1.5 | 1.5 | | 0.2 | 0.2 | 2 |
| | | SURFLON S145 | | | | | | |
| Resin fine particle (solid content) | | JONCRYL 7610 | 6 | 6 | 2 | 2 | 2 | |
| | | JONCRYL 611 | | | | | | 2 |
| Water | | | Residue | Residue | Residue | Residue | Residue | Residue |
| Total (mass %) | | | 100 | 100 | 100 | 100 | 100 | 100 |
| Content ratio (water-soluble organic solvent/surfactant) | | | 8 | 7 | 18 | 18 | 18 | 10 |
| Content ratio (fluorine surfactant and silicone surfactant)/acetylene glycol surfactant) | | | 1.875 | 1.875 | 0 | 0.1818 | 0.1818 | 6.6666 |
| Contact angle (°) | At 100 ms | | 35 | 35 | 22 | 30 | 30 | 35 |
| | At 1000 ms | | 21 | 21 | 20 | 15 | 14 | 30 |

The abbreviations of the respective components indicated in Table 1 are as follows. In Table 1, regarding the pigment, the surfactant, and the resin fine particle, the solid content of each component in the ink is indicated. Pigment PB15:3 ("CHROMOFINE BLUE", product name, produced by Dainichiseika Color & Chemicals Mfg. Co., Ltd., C.I. Pigment Blue 15:3)

Surfactant

DF110D ("SURFYNOL DF110D", product name, produced by Nissin Chemical Industry, acetylene glycol surfactant)

BYK348 (product name, produced by BYK Additives Instruments, silicone surfactant)

OLFINE E1010 (product name, produced by Air Products and Chemicals Inc., acetylene glycol surfactant)

SURFLON 5145 (product name, produced by AGC SEIMI Chemical Co., Ltd., fluorine surfactant) Resin fine particle JONCRYL 7610 (product name, produced by BASF JAPAN LTD., styrene-acrylic resin, glass transition point of 96° C., minimum film forming temperature of 63° C., and solid content of 52%)

JONCRYL 611 (product name, produced by BASF JAPAN LTD., styrene-acrylic resin, and glass transition point of 50° C.)

2.2. Recording Test

The recording medium was loaded into a remodeled machine of an ink jet printer ("SC-S30650", product name, manufactured by Seiko Epson Corporation), and the recording medium was ink jet coated with the ink filled in a head, at a resolution of 720×720 dpi with an adhesion amount of 10.0 mg/inch$^2$. During the recording, a platen heater was operated so as to adhere the ink to the heated recording medium. At this time, the platen heater was controlled such that a surface temperature (primary heating temperature) of a nozzle plate receiving the heat from the recording medium becomes temperature in Table 1. The temperature of the nozzle plate was measured by using a thermocouple provided on the nozzle plate. Note that, in Comparative Examples 4 and 5 with the primary heating temperature of 25° C., the platen heater was turned off and heating was not performed. In addition, in each recording test, at the time of adhering the ink, the recording medium surface temperature-nozzle plate was approximately 4° C.

After recording step, a recording medium was extracted from the ink jet printer, and was dried at 80° C. for five minutes. In the recording medium, a glossy polyvinylchloride sheet (SV-G-1270G produced by Roland DG Corporation) was used.

The recording speeds in Tables 2 and 3 respectively mean the following.

Recording speed 1: the speed of carriage was adjusted such that the time for one pass is set to be six seconds.

Recording speed 2: the speed of carriage was adjusted such that the time for one pass is set to be 12 seconds.

Note that, in any of the recording speeds, all nozzles were flushed with a flushing box for each pass.

Head numbers in Tables 2 and 3 respectively mean the following.

Head 1: An ink jet head illustrated in FIG. 2, the nozzle plate was obtained by forming a nozzle by etching a silicon layer. A flow path between a pressure chamber and a nozzle was formed by laminating multiple layers and had a step therein.

Head 2: The configuration is the same as that of Head 1. The difference from the head 1 was a nozzle plate, which was formed by mechanically drilling a hole in a metal layer. There was no step in the flow path between the nozzles.

Head 3: The difference from the head 1 is that a nozzle was formed in a portion which is closer to an end portion of the pressure chamber that the head 1, and an ink storage portion in the extension direction is made smaller than that of the head 1. The heads 2 and 3 were disadvantageous as compared with the head 1 in terms of manufacturing cost.

2.3. Evaluation Method (1) Image Quality

The presence or absence of printing unevenness was visually confirmed on the recording portion of the recorded matter obtained by the above recording test. The evaluation criteria are as follows. If the evaluation criteria are A, B, or C, it can be determined as good.

Evaluation Criteria

A: Unevenness of ink density is not observed in the inside or at an end of the recording portion.

B: Unevenness of ink density is not observed in the inside of the recording portion, but is observed at an end of the recording portion.

C: Unevenness of ink density is slightly observed in the inside of the recording portion.

D: Unevenness of ink density is considerably observed in the inside of the recording portion.

(2) Abrasion Resistance

Regarding the recording portion of the recorded matter obtained in the above recording test, the abrasion resistance was evaluated using a color fastness rubbing tester AB-301 (product name, manufactured by TESTER SANGYO CO., LTD). Specifically, the surface of the recording medium having an image recorded thereon was rubbed with a friction block having a white cloth (JIS L 0803 standard) attached thereto, until the coating film is peed off by adding a load of 300 g or 20 times in a reciprocating manner. Then, the state where the image (coating film) on the surface of the recording medium was peeled off was visually observed. The evaluation criteria are as follows. If the evaluation criteria are A or B, it can be determined as good.

Evaluation Criteria

A: Coating film was not peeled off even when the surface was rubbed 20 times in a reciprocating manner B: Coating film was peeled off, when the surface was rubbed 10 to 19 times in a reciprocating manner C: Coating film was peeled off, when the surface was rubbed within 9 times in a reciprocating manner (3) Landing Position Deviation after Continuous Printing The recording was continuously performed for two hours under the conditions of the above recording test. After the recording was finished, a nozzle check pattern of the nozzle used during the recording was printed so as to observe whether or not a landing position of ink droplets was deviated from a normal landing position. The printing of the nozzle check pattern was also performed even before the start of recording so as to confirm the nozzles with the landing position deviation more deteriorated as compared to before recording. The number of the nozzles was 180. The evaluation criteria are as follows. If the evaluation criterion is A or B, it can be determined as good.

Evaluation Criteria

A: The number of the nozzles with deteriorated landing position deviation was equal to or less than 1%.

B: The number of the nozzles with deteriorated landing position deviation was greater than 1% and equal to or less than 5%.

C: The number of the nozzles with deteriorated landing position deviation was greater than 5%.

(4) Nozzle Clogging Recoverability

While the ink jet printer was operated under the same conditions as the above recording test, the ink jet head was stopped on the recording medium, and dummy recording was continuously performed for two hours without discharging ink from the nozzle at all. The state was assumed that a cap was removed and left to stand. After the recording was finished, cleaning was performed to discharge 1 cc of ink from nozzle rows (180 nozzles) by suction cleaning. The evaluation criteria are as follows. If the evaluation criteria are A or B, it can be determined as good.

Evaluation Criteria

A: The number of cleanings required for recovering the discharging properties of all nozzles was equal to or less than 1.

B: The number of cleanings required for recovering the discharging properties of all nozzles was 2.

The number of cleanings required for recovering the discharging properties of all nozzles was equal to or more than 3.

2.4. Evaluation Results

Printing conditions and evaluation results of the respective examples and comparative examples are indicated in the following Tables 2 and 3.

In Example 7, Ink 7 in which the amount of the resin fine particles was increased was used, and the ink film was likely to be welded onto the nozzle wall surface by increasing the amount of the resin fine particles, and as a result of the

TABLE 2

|  |  | Example 1 | Example 2 | Example 3 | Example 4 | Example 5 | Example 6 | Example 7 | Example 8 | Example 9 |
|---|---|---|---|---|---|---|---|---|---|---|
| Recording conditions | Ink No. | Ink 1 | Ink 2 | Ink 3 | Ink 4 | Ink 5 | Ink 6 | Ink 7 | Ink 8 | Ink 7 |
|  | Primary heating temperature (nozzle plate temperature) (° C.) | 40 | 40 | 40 | 40 | 40 | 40 | 40 | 40 | 35 |
|  | Head No. | Head 1 | Head 1 | Head 1 | Head 1 | Head 1 | Head 1 | Head 1 | Head 1 | Head 1 |
|  | Recording speed | Recording speed 1 | Recording speed 1 | Recording speed 1 | Recording speed 1 | Recording speed 1 | Recording speed 1 | Recording speed 1 | Recording speed 1 | Recording speed 1 |
| Evaluation results | Landing position deviation after continuous printing | A | A | A | A | B | A | B | A | A |
|  | Nozzle clogging recoverability | A | A | A | A | B | A | B | A | A |
|  | Image quality (bleeding) | A | A | A | A | A | C | A | A | B |
|  | Abrasion resistance | A | B | A | B | B | C | A | B | A |

TABLE 3

|  |  | Example 10 | Example 11 | Example 12 | Example 13 | Comparative Example 1 | Comparative Example 2 | Comparative Example 3 | Comparative Example 4 | Comparative Example 5 |
|---|---|---|---|---|---|---|---|---|---|---|
| Recording conditions | Ink No. | Ink 7 | Ink 7 | Ink 1 | Ink 12 | Ink 9 | Ink 10 | Ink 11 | Ink 1 | Ink 9 |
|  | Primary heating temperature (nozzle plate temperature) (° C.) | 40 | 40 | 40 | 40 | 40 | 40 | 40 | 25 | 25 |
|  | Head No. | Head 2 | Head 3 | Head 1 | Head 1 | Head 1 | Head 1 | Head 1 | Head 1 | Head 1 |
|  | Recording speed | Recording speed 1 | Recording speed 1 | Recording speed 2 | Recording speed 1 | Recording speed 1 | Recording speed 1 | Recording speed 1 | Recording speed 1 | Recording speed 1 |
| Evaluation results | Landing position deviation after continuous printing | A | A | B | B | C | C | A | A | A |
|  | Nozzle clogging recoverability | A | A | — | B | C | C | C | A | A |
|  | Image quality (bleeding) | A | A | A | A | B | A | C | D | D |
|  | Abrasion resistance | A | A | A | A | A | A | B | A | A |

As apparent from the results of Tables 2 and 3, in the ink jet recording method of Examples 1 to 13, it was possible to obtain a recorded matter which has small landing position deviation after the continuous printing, is excellent in the nozzle clogging recoverability, and has excellent image quality with small printing unevenness.

In Example 5, Ink 5 which does not contain an acetylene glycol surfactant was used, and as a result of the evaluation, the landing position deviation after the continuous printing and the nozzle clogging recoverability were slightly deteriorated.

In Example 6, Ink 6 which contains glycerin was used. Ink 6 was not excellent in the ink drying property, and thereby a recorded matter which is slightly deteriorated in terms of the printing unevenness of the ink, and is not excellent in the abrasion resistance was obtained.

evaluation of landing position deviation after continuous printing was slightly deteriorated.

In Example 8, Ink 8 in which the amount of 2-pyrrolidone was decreased was used, and as a result of decreasing the amount of 2-pyrrolidone, the evaluation of the landing position deviation after the continuous printing and the nozzle clogging recoverability was improved.

In Example 9, when the primary heating temperature was set to be slightly low, it was difficult for the ink film to be welded onto the nozzle wall surface, and the evaluation of the landing position deviation after continuous printing and the clogging recoverability was improved.

In Examples 10 and 11, even in a case where a structure of the head is changed, it was possible to obtain a recorded matter which has small landing position deviation after the continuous printing, is excellent in the nozzle clogging recoverability, and has excellent image quality with small printing unevenness. However, the heads 2 and 3 are disadvantageous in that those are not suitable for mass production and thus are difficult to manufacture.

In Example 12, the ink film was likely to be welded onto the nozzle wall surface by making the pass time as long as 12 seconds, and as a result of the evaluation of landing position deviation after continuous printing was slightly deteriorated.

In addition, from the comparison between Example 1 and Example 13, it was found that as the glass transition point of the resin of the resin fine particles contained in the ink was high, the landing position deviation was small and the nozzle clogging recoverability was excellent.

In contrast, in Comparative Examples 1 to 3, Ink 9 and Ink 10 in which a contact angle of the ink with respect to the ink film is not within the predetermined range were used, and as a result, the ink films were accumulated in the head, and the evaluation of the clogging recoverability was slightly deteriorated. In Comparative Examples 4 and 5, as a result of not performing the heating step at the time of ink adhesion, a recorded matter which was deteriorated in terms of printing unevenness was obtained. The head of Comparative Examples 1 to 3 after the clogging recoverability test was cut and the inside of the pressure chamber was observed. As a result, it was observed that the resin contained in the ink was adhered to the wall surface in the pressure chamber so as to prevent the ink from flowing. On the other hand, the head of Example 1 was observed in the same way, but the resin adhesion for preventing the ink from flowing was not observed. From this point, it was presumed that the adhesion and accumulation of the resin contained in the ink inside the head affected the clogging recoverability.

The invention is not limited to the above-described embodiments, and various modifications are possible. For example, the invention includes a configuration substantially the same as that described in the embodiment (for example, a configuration having the same function, method, and result, or a configuration having the same object and effect). Further, the invention includes a configuration in which non-essential parts of the configuration described in the embodiment are replaced. Further, the invention includes a configuration that can achieve the same effects as the configuration described in the embodiment, or a configuration that can achieve the same object. In addition, the invention includes a configuration in which a well-known technique is added to the configuration described in the embodiment.

The entire disclosure of Japanese Patent Application No. 2016-191290, filed Sep. 29, 2016 is expressly incorporated by reference herein.

What is claimed is:

1. An ink jet recording method comprising:
heating a recording medium; and
discharging a water-based ink composition which contains resin fine particles, water, a water-soluble organic solvent, and a surfactant from an ink jet head so as to adhere the water-based ink composition to the heated recording medium in the heating,
wherein the water-based ink composition has a contact angle of the water-based ink composition with respect to an ink film obtained by drying the water-based ink composition is equal to or larger than 25° at 100 ms, and is equal to or larger than 20° at 1000 m,
the water-based ink composition contains, as a surfactant, an acetylene glycol surfactant and at least one of a silicone surfactant and a fluorine surfactant, and
the content of at least one of the silicone surfactant and the fluorine surfactant is 0.8% by mass or more with respect to a total amount of an ink composition.

2. The ink jet recording method according to claim 1, wherein in the water-based ink composition, a content of the water-soluble organic solvent having a standard boiling point of equal to or higher than 280° C. is equal to or less than 3% by mass.

3. The ink jet recording method according to claim 1, wherein the content of the at least one of the silicone surfactant and the fluorine surfactant is in the range of 0.8% to 5% by mass with respect to a total amount of an ink composition, and a content of the acetylene glycol surfactant is in the range range of 0.1% to 1.5% by mass with respect to a total amount of an ink composition.

4. The ink jet recording method according to claim 1, wherein the water-based ink composition contains a nitrogen-containing solvent as the water-soluble organic solvent.

5. The ink jet recording method according to claim 1, wherein a surface temperature of a nozzle surface at the time of adhering the water-based ink composition is equal to or lower than 55° C.

6. The ink jet recording method according to claim 1, wherein the ink jet head has a step in a flow path through which ink passes from a pressure chamber to a nozzle.

7. The ink jet recording method according to claim 1, wherein the pressure chamber of the ink jet head includes an ink storage portion for storing ink in a direction extended from an outflow port in an ink movement direction in which a supply port for supplying ink to the pressure chamber and the outflow port for discharging the ink from the pressure chamber are connected to each other.

8. The ink jet recording method according to claim 1, which is performed by using a serial printer,
wherein a time during which the recording medium faces the ink jet head during one main scanning is equal to or shorter than 12 seconds.

9. The ink jet recording method according to claim 1, wherein in the water-based ink composition, a content (% by mass) ratio (water-soluble organic solvent/surfactant) of the water-soluble organic solvent to the surfactant is in a range of 3 to 17.

10. The ink jet recording method according to claim 1, wherein a resin of the resin fine particle contained in the water-based ink composition includes a resin having a glass transition point of equal to or higher than 40° C.

11. A recording apparatus which performs recording by the ink jet recording method according to claim 1,
wherein the recording apparatus controls recording to be performed for one hour or longer without performing maintenance in which ink is discharged from an ink jet head by a unit other than a pressure generation unit for recording by discharging ink.

12. A recording apparatus which performs recording by the ink jet recording method according to claim 2,
wherein the recording apparatus controls recording to be performed for one hour or longer without performing maintenance in which ink is discharged from an ink jet head by a unit other than a pressure generation unit for recording by discharging ink.

13. A recording apparatus which performs recording by the ink jet recording method according to claim 3,
wherein the recording apparatus controls recording to be performed for one hour or longer without performing maintenance in which ink is discharged from an ink jet head by a unit other than a pressure generation unit for recording by discharging ink.

14. A recording apparatus which performs recording by the ink jet recording method according to claim 4, wherein the recording apparatus controls recording to be performed for one hour or longer without performing maintenance in which ink is discharged from an ink jet head by a unit other than a pressure generation unit for recording by discharging ink.

15. A recording apparatus which performs recording by the ink jet recording method according to claim 5, wherein the recording apparatus controls recording to be performed for one hour or longer without performing maintenance in which ink is discharged from an ink jet head by a unit other than a pressure generation unit for recording by discharging ink.

16. The ink jet recording method according to claim 1, wherein the content of the at least one of the silicone surfactant and the fluorine surfactant is 0.8% to 5% by mass with respect to a total amount of an ink composition.

17. The ink jet recording method according to claim 1, Wherein the content of the resin fine particles as solid content is 6% to 20% by mass with respect to the total mass of the ink composition.

18. The ink jet recording method according to claim 1, wherein a content (by mass) ratio of the fluorine surfactant and the silicone surfactant to the acetylene glycol surfactant is 1.875 to 10.

19. The ink jet recording method according to claim 4, wherein a content of the nitrogen-containing solvent is 15% to 25% by mass with respect to the total mass of the ink composition.

20. The ink jet recording method according to claim 5, wherein a surface temperature of the nozzle surface at the time of adhering the water-based ink composition is 30° C. to 38° C.

\* \* \* \* \*